(12) United States Patent
Pons et al.

(10) Patent No.: US 8,102,946 B2
(45) Date of Patent: Jan. 24, 2012

(54) SYSTEMS AND METHODS FOR PERFORMING SISO DETECTION IN A WIMAX ENVIRONMENT

(75) Inventors: Julien D. Pons, Carteret, NJ (US); Patrick Duvaut, Tinton Falls, NJ (US)

(73) Assignee: Ikanos Communications, Inc., Fremont, CA (US)

(*) Notice: Subject to any disclaimer, the term of this patent is extended or adjusted under 35 U.S.C. 154(b) by 812 days.

(21) Appl. No.: 12/168,480

(22) Filed: Jul. 7, 2008

(65) Prior Publication Data
US 2010/0002808 A1    Jan. 7, 2010

(51) Int. Cl.
*H03K 9/00* (2006.01)

(52) U.S. Cl. ........ 375/316; 375/264; 375/340; 375/346; 375/350; 370/310; 370/342; 370/343; 455/59; 455/63.1

(58) Field of Classification Search .......... 375/264, 375/316, 340, 346, 350; 370/310, 342, 343; 455/59, 63.1
See application file for complete search history.

(56) References Cited

U.S. PATENT DOCUMENTS

| | | | |
|---|---|---|---|
| 7,391,816 B2* | 6/2008 | Biswas et al. | 375/264 |
| 7,733,996 B2* | 6/2010 | Wu et al. | 375/350 |
| 7,873,021 B2* | 1/2011 | Petre et al. | 370/342 |
| 2007/0025421 A1* | 2/2007 | Shattil | 375/136 |
| 2008/0310554 A1* | 12/2008 | Siti et al. | 375/340 |
| 2010/0183104 A1* | 7/2010 | Alexander et al. | 375/346 |

OTHER PUBLICATIONS

J. Pons, "Derivation and Optimization of Convolutional Turbo Coded OFDM and DMT Modulation Schemes", PhD thesis, pp. 43-44; University of Cergy Pontoise, France, Jul. 2007.
IEEE standard 802.16e-2005 (Amendment and Corrigendum to IEEE Std 802.16-2004); sections 8.4.9.2.3.5, 8.4.9.4.2.
J. Pons, "ASK demodulation, optimized architecture achieving near-optimal performance", Conexant white paper, Oct. 22, 2007.

* cited by examiner

*Primary Examiner* — Chieh M Fan
*Assistant Examiner* — Fitwi Hailegiorgis
(74) *Attorney, Agent, or Firm* — Pillsbury Winthrop Shaw Pittman LLP

(57) ABSTRACT

In accordance with some embodiments, a communication system is described that comprises a soft-output detector configured to receive a transmit signal and output reliability information regarding the received signal. In accordance with such embodiments, the detector comprises a symbol combiner configured to operate in both a repetition mode and a non-repetition mode, wherein repetition mode comprises receiving a plurality of signals for the transmit signal.

17 Claims, 8 Drawing Sheets

SYSTEMS AND METHODS FOR PERFORMING SISO DETECTION IN A WIMAX ENVIRONMENT

TECHNICAL FIELD

The present disclosure generally relates to wireless communications, and more particularly, to performing SISO detection in a WiMAX environment.

BACKGROUND

Wireless communication systems are widely deployed to provide various types of communication such as voice, data, and so on. To improve a given link's robustness, WiMAX (Worldwide Interoperability for Microwave Access) systems based on the IEEE 802.16 standard may provide for the repetition of data over a SISO (single-input single-output) channel. Various modes may be supported, such as a classical repetition protocol where exact copies of a QAM signal sequence or codeword are resent. Other modes include Hybrid ARQ (HARQ), which is a variation of the ARQ error control method. Both protocols involve at least some level of repetition involving transmission of QAM signals.

Those skilled in the art will appreciate that there is a need for optimized implementations of SISO detectors for application in shared communications medium, such as, but not limited to, a wireless network whereby computational resources are efficiently utilized. The wireless network may conform, for example, to the WiMAX standard. Furthermore, there is a need for improving the SNR (signal-to-noise ratio) associated with received signals and ultimately for improving the overall error performance when a repetition channel is considered involving, for example, WiMAX's repetition and HARQ modes.

SUMMARY

Briefly described, one embodiment, among others, is a communication system. The system comprises a soft-output detector configured to receive a transmit signal and output reliability information regarding the received signal. In accordance with such embodiments, the detector comprises a symbol combiner configured to operate in both a repetition mode and a non-repetition mode, wherein repetition mode comprises receiving a plurality of signals for the transmit signal.

Another embodiment is a method that comprises receiving a transmit signal in a WiMAX (Worldwide Interoperability for Microwave Access) environment. In response to receiving a plurality of signals for the transmit signal, the method further comprises combining the plurality of signal into a single signal. The method also comprises demodulating the single signal and providing reliability information regarding the demodulated symbol.

Another embodiment is communication system that comprises means for receiving a transmit signal in a WiMAX (Worldwide Interoperability for Microwave Access) environment, means for combining a plurality of signals into a single signal when a plurality of signals is received for the transmit signal, and means for performing zero-forcing (ZF) equalization on the transmit signal when a single signal is received.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
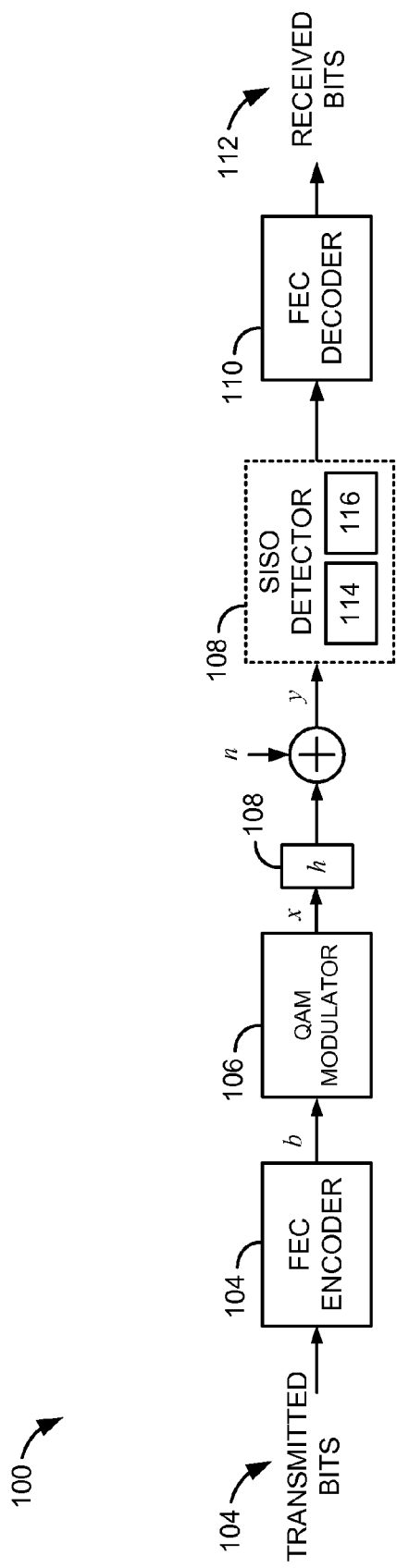
FIG. 1 is a wireless communication system incorporating a detector.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Various embodiments are described herein for performing soft-output detection that may be used in SISO (single-input single-output) communication systems. In particular, the systems and methods described herein may be used within a shared communications medium, such as, but not limited to, a wireless network. The wireless network may conform, for example, to the WiMAX (Worldwide Interoperability for Microwave Access) standard. Those skilled in the art will appreciate that the embodiments described herein are directed to an optimized approach for hardware implementation of SISO detectors.

Various embodiments described include a symbol combiner that efficiently improves the received SNR (signal-to-noise ratio) and ultimately the overall error performance when a repetition channel is incorporated that utilizes, for example, WiMAX's repetition and HARQ modes. The exemplary symbol combiners described herein are based on a maximum ratio combining (MRC) algorithm, which reverts back to a classical zero-forcing (ZF) equalizer when a non-repetition channel is involved. According to some embodiments, the overall architecture for the detector may be implemented using low-complexity ASK (amplitude shift key) demodulators, which are used to demodulate QAM signals transmitted over a SISO channel.

Reference is made to FIG. 1, which depicts a wireless communication system incorporating a SISO detector in accordance with some embodiments. The system includes a FEC (forward error correction) encoder 104 and a QAM modulator 106. In the system shown, FEC (forward error correction) coded QAM signals are transmitted over a SISO channel with a complex gain h 108. The received QAM signal y is received by the SISO detector 108, which then forwards the signal to an FEC decoder 110, which outputs the received bits 112.

In accordance with some embodiments, the SISO detector 108 receives QAM signal y and outputs a bit-wise soft-reliability information represented by $\Lambda$. The FEC decoder 110 receives this vector of bit-wise soft-reliability information for received signals. For purposes of nomenclature, the soft-information for the individual bits is represented as $\Lambda(b_0), \ldots, \Lambda(b_{M-1})$. Generally, an approximation for the $m^{th}$ bit may be represented by the LLR (log likelihood ratio) as follows:

$$\Lambda(b_m) = -\frac{1}{2\sigma^2}(\|y - hx_{m,1}\|^2 - \|y - hx_{m,0}\|^2)$$

where $$x_{m,z} = \underset{x \in \Omega | b_m = z}{\operatorname{argmin}} \|y - hx\|^2 \ \forall\ m \in \{0, \ldots, M-1\}, z \in \{0, 1\},$$

and where $\Omega|b_m = z$ is the subset of $\Omega$ formed by signals with $b_m = z$. As the gain h is generally not available, an estimate of h, denoted as $\hat{h}$, may be utilized. For purposes of this disclosure, a perfect channel estimation (i.e., $h = \hat{h}$) will be assumed.

Embodiments of a low-complexity architecture are described herein for computing the bit-wise LLR $\Lambda(b_m)$ based on an input signal $\tilde{y}$. In accordance with some embodiments, the SISO detector 108 may include an equalization module 114 and a demodulation module 116. The equalization module 114 filters each received QAM signal. This may be performed, for example, utilizing a single-tap equalizer, represented by f, where f is a complex scalar. The equalized signal is represented by $\tilde{y}$ and is equal to the product, f·y. It should be noted that the equalization steps involves approximately just one complex multiplication per received QAM signal.

The demodulation module 116 demodulates the equalized signal into soft-reliability metrics on a bit-by-bit basis. As described earlier, these soft-reliability metrics are denoted by $\Lambda(b_0), \ldots, \Lambda(b_{M-1})$. As the QAM modulator 106 utilizes independent Gray coding for each dimension of a signal, the QAM demodulator 106 operates on the real and imaginary parts of each equalized QAM signal ($\tilde{y}_i$ and $\tilde{y}_q$) independently. Accordingly, ASK demodulators are utilized in exemplary embodiments of the SISO detector 108.

Figure 2:
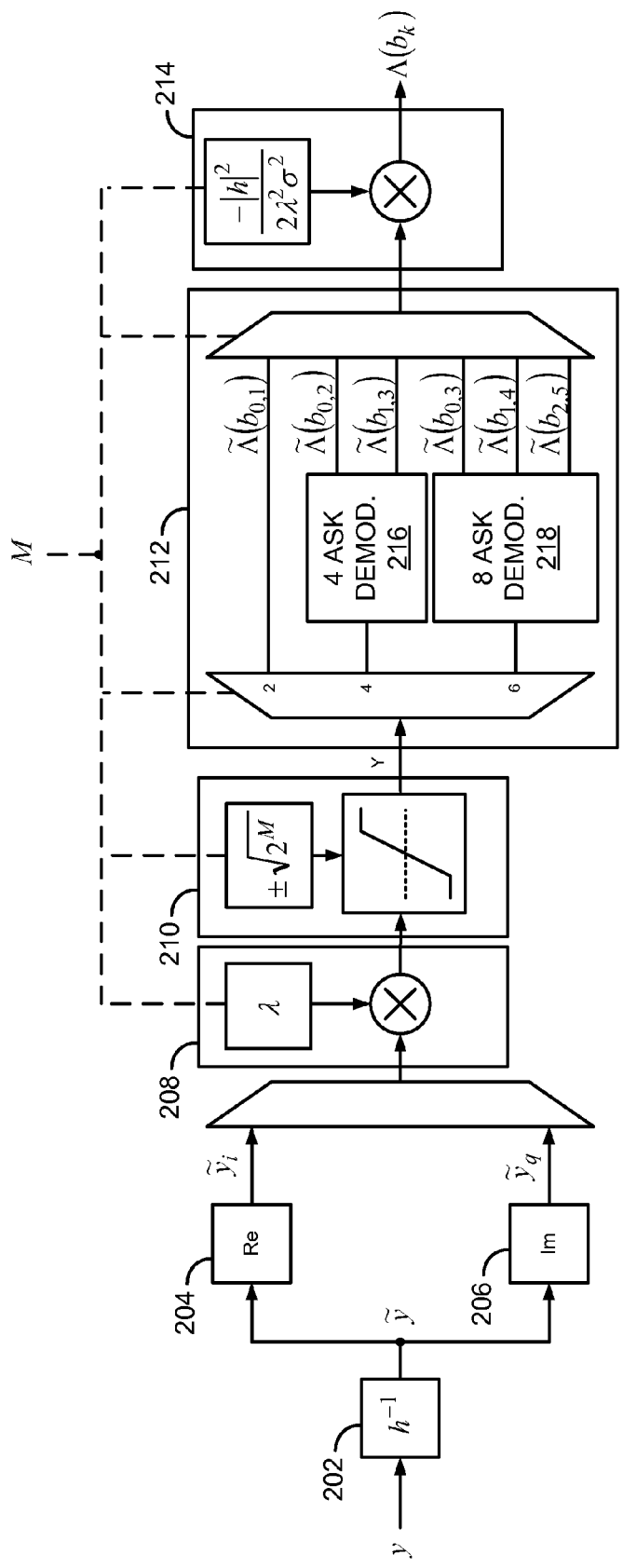
FIG. 2 is an embodiment of the detector shown in FIG. 1.

Reference is now made to FIG. 2, which depicts an embodiment of the SISO detector shown in FIG. 1. The non-limiting example depicted in FIG. 2 assumes serial demodulation of $\tilde{y}_i$ and $\tilde{y}_q$. However, the SISO detector can be adapted to also support a parallel demodulation scheme. As described earlier, the received signal y is first filtered by the equalization module 114. The equalized signal is represented by $\tilde{y}$ and is equal to the product, f·y. For the embodiment shown in FIG. 2, a zero forcing (ZF) equalizer $f = h^{-1}$ 202 is considered. As described earlier, it should be noted that exemplary embodiments of SISO detectors revert to a classical zero-forcing (ZF) equalizer when a non-repetition channel is involved.

As depicted in FIG. 2, the real 204 and imaginary 206 components of $\tilde{y}$ are processed separately. The real 204 and imaginary 206 components are passed to a rescaling block 208 where the real 204 and imaginary 206 components are rescaled by an inverse scaling factor $\lambda$ to de-normalize the received equalized signal and rescale the signal to a point Y in the odd integer 1-D grid. The inverse scaling factor $\lambda$ is related to the value M, which varies as a function of the constellation size and represents the number of bits per constellation. The inverse scaling factor $\lambda$ as a function of the modulation order M is shown in the table below.

TABLE 1

| M | 2 | 4 | 6 |
|---|---|---|---|
| $\lambda$ | $\frac{\sqrt{2}}{4}$ | $\sqrt{10}$ | $\sqrt{42}$ |

Once the equalized received signal is rescaled or normalized, the received signal is forwarded to saturation block 210 where the received signal is saturated to a closed range. In the non-limiting example shown in FIG. 2, the received signal is saturated to $\pm\sqrt{2^M}$. The signal Y is then sent to an appropriate normalized LLR computation module 212.

One of ordinary skill in the art will appreciate that scaling to the odd integer grid using rescaling block 208 removes the need for complex operations such as multiplication operations while computing the normalized LLR $\tilde{\Lambda}(b_m)$. It should be noted, however, that a scaling operation is required to convert the normalized LLR back to its true value. As depicted in the normalized LLR computation module 212, the LLR for a modulation order of 2 (M=2) can be derived without the use of an ASK demodulator, thereby further reducing the need for complex operations while computing the LLR. For a modulation order of 4, the normalized signal is routed to the 4 ASK demodulator 216, which has 2 outputs, whereas the 8 ASK demodulator 218 has 3 outputs.

The normalized LLR $\tilde{\Lambda}(b_m)$ is scaled back to its true value in block 214 such that $$\Lambda(b_m) = \tilde{\Lambda}(b_m) \times \left(\frac{-|h|^2}{2\lambda^2\sigma^2}\right)$$

to obtain the LLR value, $\Lambda(b_m)$. For some embodiments, this "un-scaling" (or rescaling) factor may be given by:

$$\frac{-|h|^2}{(2\lambda^2\sigma^2)}.$$

It should be noted that unlike the scaling factor $\lambda$, the un-scaling factor can generally be approximated with no performance degradation. For example, for some embodiments, shift operations may be performed in place of the multiplication operation to approximate the un-scaling/rescaling function. As a non-limiting example, for a convolutional coded AWGN transmission, the un-scaling factor can be approximated by −1 while achieving no degradation in performance. It should be emphasized that for exemplary embodiments such as the embodiment depicted in FIG. 2, the use of scaling and saturation modules 208, 210 allows the ASK demodulators 216, 218 in the LLR computation module 212 to be implemented without the use of multiplication operations, which are computationally intensive in nature.

Figure 3:
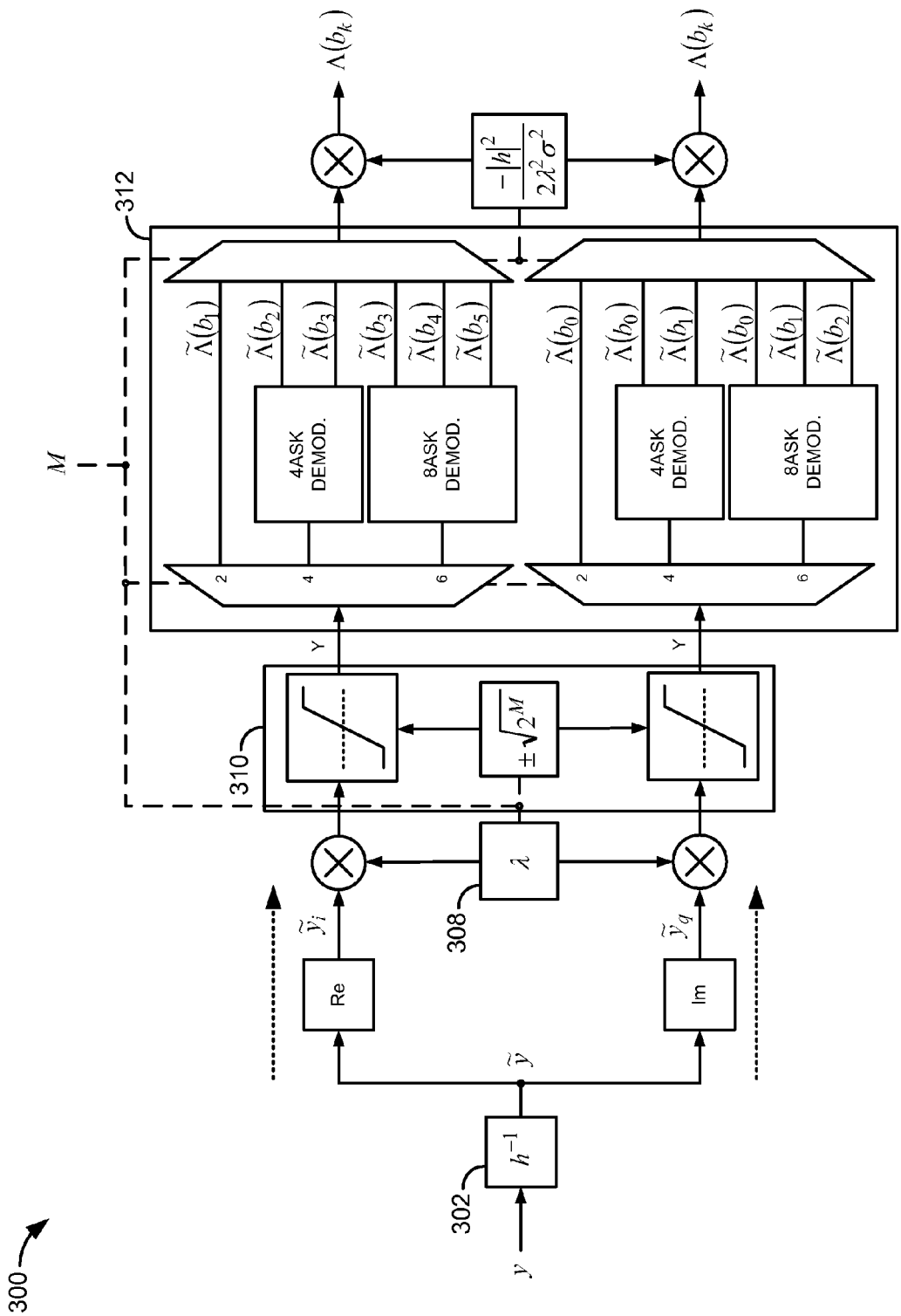
FIG. 3 is an alternative embodiment of the SISO detector shown in FIG. 1.

The SISO detector depicted in FIG. 2 operates based on the assumption that serial demodulation of $\tilde{y}_i$ and $\tilde{y}_q$ is used. In accordance with other embodiments, however, the demodulation of $\tilde{y}_i$ and $\tilde{y}_q$ can also be performed in a parallel fashion. Reference is made to FIG. 3, which depicts an alternative embodiment of the SISO detector shown in FIG. 1. The SISO detector shown is similar to the embodiment shown in FIG. 2.

In FIG. 3, however, the processing of the real component of the equalized received signal is performed separately from the processing of the imaginary component, as depicted in blocks 308, 310, and 312. While the embodiment shown in FIG. 3 generally requires more computational resources, it should be emphasized that the throughput of the detector 300 is also increased.

To improve the robustness of a given link, WiMAX compliant systems provide for the repetition of data. As known by those skilled in the art, various modes are supported, including a classical repetition mode where exact copies of a QAM signal sequence or codeword is resent. Another mode relates to the Hybrid ARQ (HARQ) mode, which involves resending only a portion of the codeword's redundancy. Such repetition modes can be incorporated into the receiver side in order to improve the received SNR, and hence the performance in decoding signals. Based on the foregoing, alternative embodiments are described below wherein the embodiment depicted in FIG. 3 is modified to take into account signals transmitted in accordance with a repetition mode.

Figure 4:
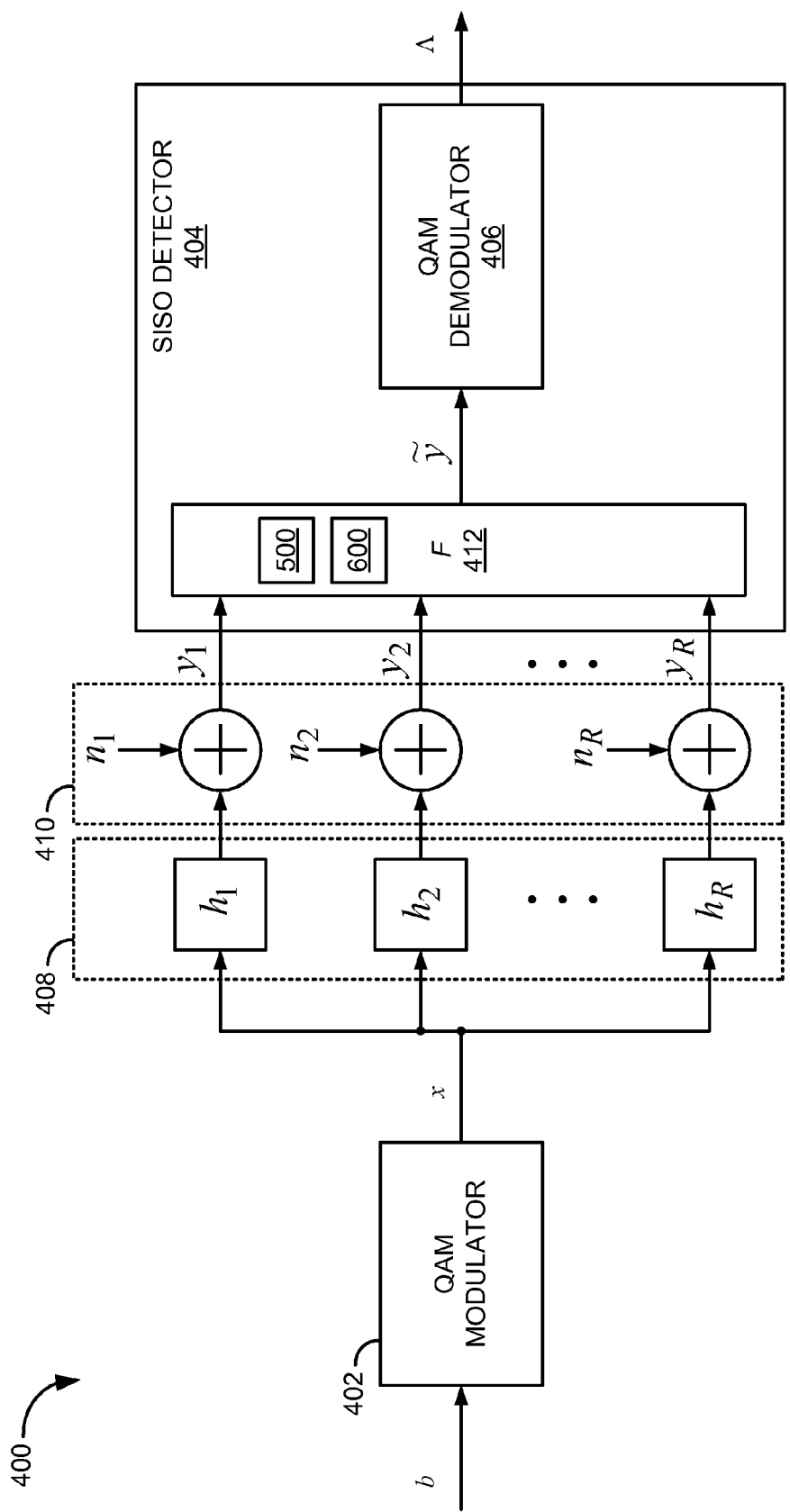
FIG. 4 is an equivalent model for a wireless communication system incorporating a SISO detector whereby the same signal is transmitted over R independent channels.

An alternative embodiment of the SISO detector depicted in FIG. 2 is now described. The alternative embodiment may be utilized in communications systems incorporating a repetition protocol or mode with respect to the transmit signals. Reference is made to FIG. 4, which is an equivalent model for a wireless communication system incorporating a SISO detector whereby the same signal is transmitted over R independent channels. It should be emphasized that for the model depicted in FIG. 4, the use of R independent channels to transmit the same signal is essentially equivalent to repeating the same signal over the same channel. The model in FIG. 4 is used to illustrate the operation of the SISO detector shown. Assuming a repetition factor of R, the system 400 shown in FIG. 4 transmits R identical QAM signals over R independent channels. The system 400 includes a QAM modulator 402 and a SISO detector 404, which includes a QAM demodulator 406. Block 408 represents the complex channel gain for each transmission (1 to R). Block 410 represents the complex circular AWGN (additive white Gaussian noise) with variance $\sigma^2$ for each transmission. The received QAM signal for the $k^{th}$ transmission is derived according to:

$$y_k = h_k x + n_k.$$

The system 400 further includes a symbol combiner 410, the function of which may be represented by:

$$F = [f_1 f_2 \ldots f_R]^T.$$

The received equalized signal $\tilde{y}$ is output from the symbol combiner 410 and forwarded to the QAM demodulator 406, which eventually outputs the LLR value. With reference back to FIGS. 1-3, the primary difference depicted in FIG. 4 with respect to the embodiments shown in FIGS. 2 and 3 involves the replacement of the ZF equalizer 202, 302 with the symbol combiner 412. The symbol combiner 412 takes the R received signals associated with the same transmit signal and outputs a single symbol which correlates with the equalized symbol $\tilde{y}$ depicted in FIGS. 2 and 3.

The output of the symbol combiner 412 may be expressed as:

$$F = \frac{H^H}{HH^H},$$

where $H^H$ represents the transpose conjugate of H, which may be represented by $H=[h_1 h_2 \ldots h_R]$. Accordingly, the output of the symbol combiner 412, $\tilde{y}$, may be expressed by the following equation:

$$\tilde{y} = \frac{\sum_{k=1}^{R} y_k h_k^*}{\sum_{k=1}^{R} h_k h_k^*}$$

where $h_k^*$ denotes the complex conjugate of $h_k$. It should be noted, however, that the expression for the combined signal above is a non-limiting example and may change based on the matched filters incorporated. As another non-limiting example, the following expression for F may be utilized:

$$F = \frac{H^H}{\sqrt{HH^H}}.$$

Figure 5:
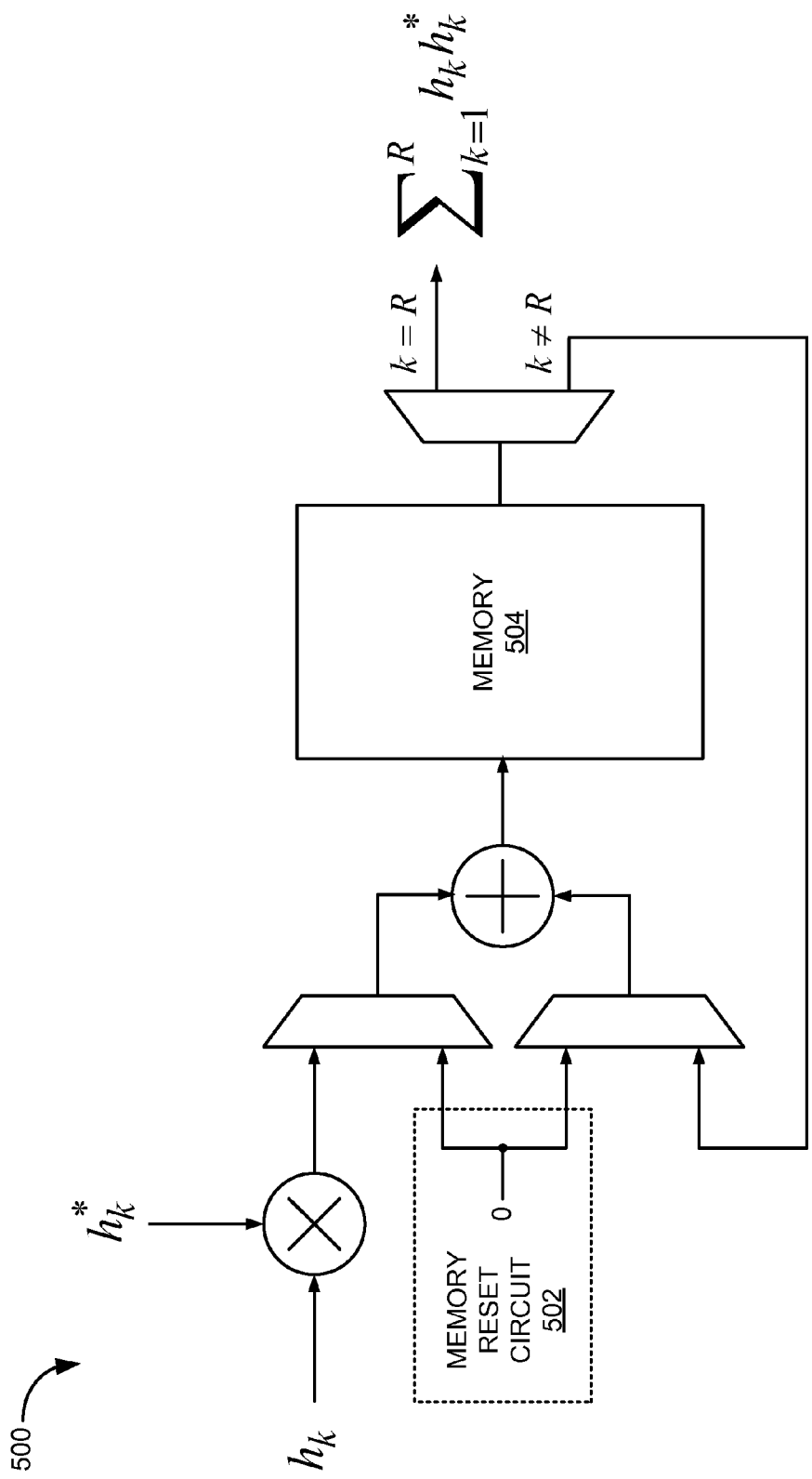
FIGS. 5-6 provide exploded views of various components in the symbol combiner shown in FIG. 4.
Figure 6:
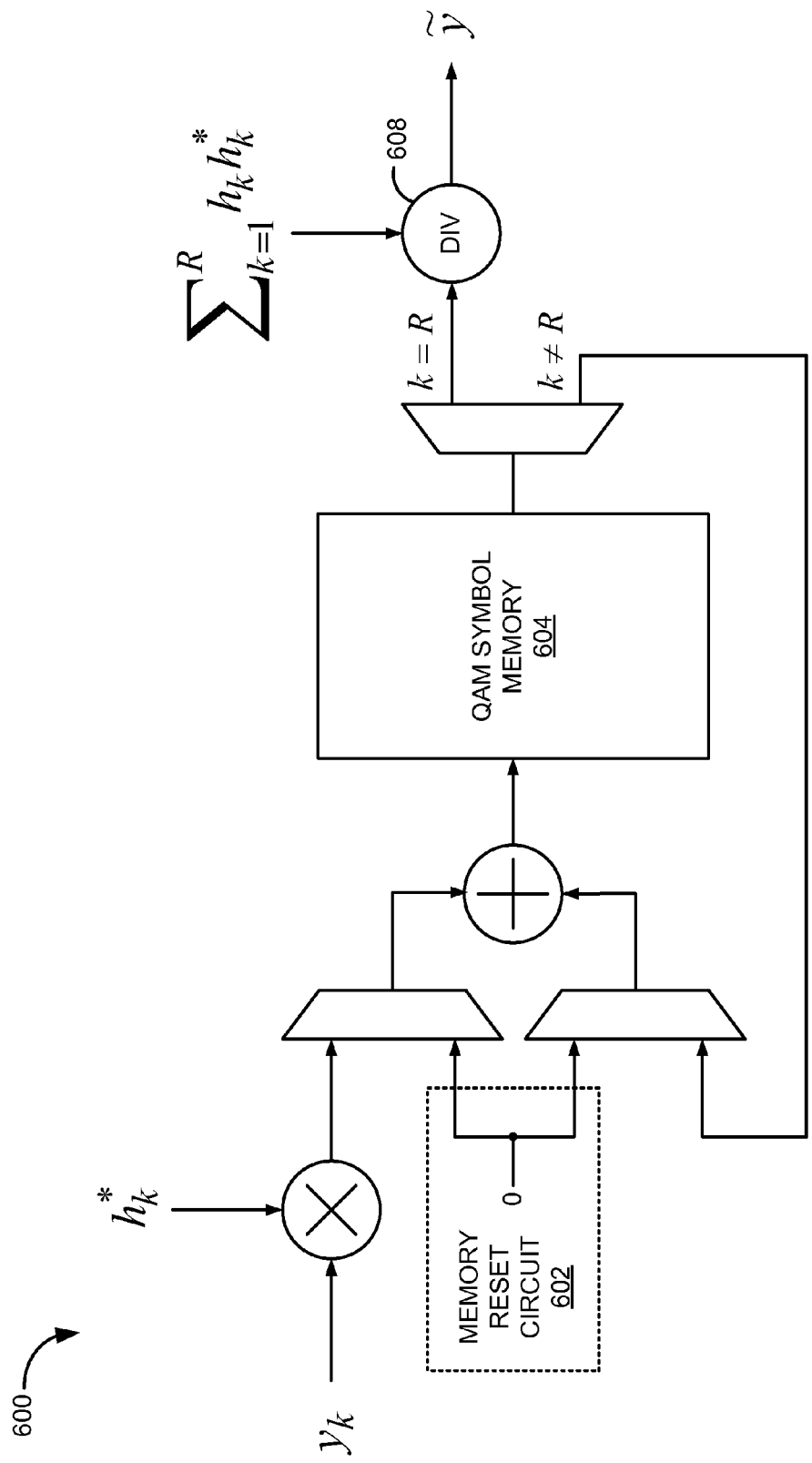

FIGS. 5-6 provide exploded views of various components in the symbol combiner shown in FIG. 4. With reference to FIG. 5, the sum $\Sigma_k y_k h_k^*$ can be computed recursively each time a new version $y_k$ of the repeated symbol (and the corresponding channel gain $h_k$) is received. The sum $\Sigma_k h_k h_k^*$ can be computed using different methods. For some embodiments, the sum may be pre-computed (e.g., in the channel estimation module) and fed to the detector. Module 500 is an exemplary circuit for calculating the sums $\Sigma_k h_k h_k^*$ and $\Sigma_k y_k h_k^*$. The module 500 includes a memory reset circuit 502 for the memory 504 shown in FIG. 5. Memory 504 stores the sum $\Sigma_k h_k h_k^*$ while this value is updated recursively. Upon reaching k iterations, the final sum $\Sigma_k h_k h_k^*$ is output.

Referring now to FIG. 6, the ZF equalizer 202 shown in FIG. 2 is replaced with a maximum ratio combiner (MRC) 600. It should be noted that for a single repetition (R=1), the output of the MRC 600 and ZF equalizer 202 in FIG. 2 are equivalent. The MRC 600 depicted in FIG. 6 includes a memory reset circuit 602 and a QAM symbol memory 604, which is configured to store the sum $\Sigma_k y_k h_k^*$ (which may be calculated using the exemplary circuit shown in FIG. 5), which is divided by the sum $\Sigma_k h_k h_k^*$ (also derived using the exemplary circuit shown in FIG. 5) to derive the MRC 500 output.

Figure 7:
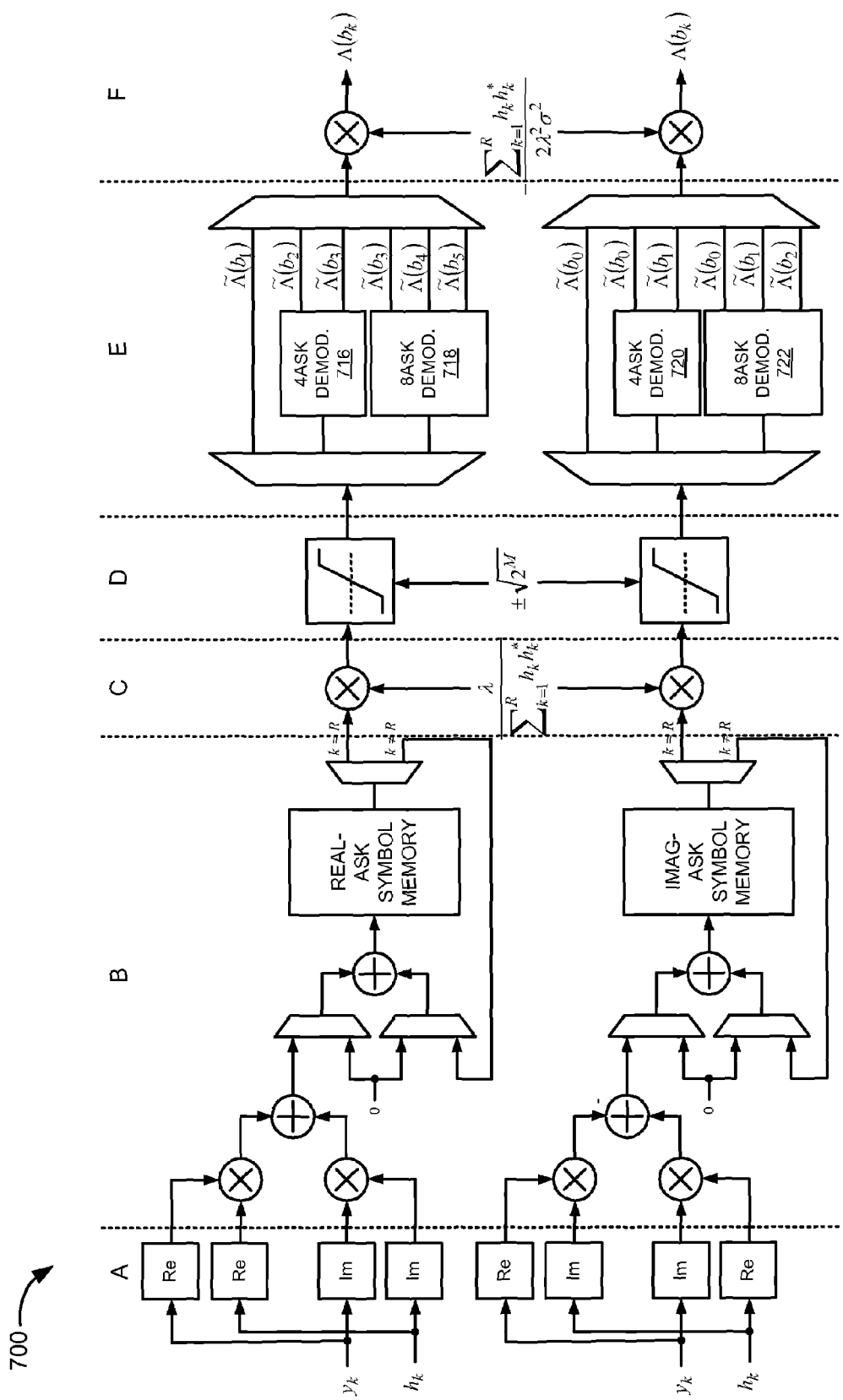
FIG. 7 is an exemplary embodiment of the detector shown in FIG. 4 where the real and imaginary parts of the received signal are processed in parallel.

Having described a SISO detector for communication systems deploying a repetition of transmit signals, reference is made to FIG. 7, which is an exemplary embodiment of a SISO detector for repetition channels where the real and imaginary parts of the received signal are processed in parallel. Assuming again a repetition factor of R, the system 700 transmits R identical QAM signals over R independent channels. The exemplary SISO detector depicted in FIG. 7 is based on the concepts described in the preceding figures. Referring back briefly to FIGS. 2 and 3, the real and imaginary components of $\tilde{y}$ are initially processed separately. In FIG. 2, the real and imaginary components are multiplexed before being passed on to the rescaling block 208 and the saturation block 210, whereby the real and imaginary components are fed alternatively into the rescaling block 208. For the alternative embodiment shown in FIG. 3, however, the processing of the real and imaginary components of the equalized received signal is performed entirely separately (and concurrently), as depicted in blocks 308, 310, and 312.

While the embodiment shown in FIG. 3 generally requires more computational resources, it should be emphasized that the throughput of the detector 300 is also increased. Referring now to FIG. 7, the embodiment shown incorporates the parallel processing architecture depicted in FIG. 3. In stage A in FIG. 7, the real and imaginary components of the received signal are extracted. The real and imaginary components for the channel gain parameter, $h_k$, are also extracted for later processing. In stage B, the sums $\Sigma_k h_k h_k^*$ and $\Sigma_k y_k h_k^*$ are calculated in a recursive fashion similar to that shown earlier in FIGS. 5 and 6.

In stage C, rescaling is performed on the real and imaginary components by an inverse scaling factor $\lambda$ to de-normalize the received equalized signal and rescale the signal to a point Y in the odd integer 1-D grid. The inverse scaling factor $\lambda$ is related to the value M, which varies as a function of the constellation size and represents the number of bits per constellation. The inverse scaling factor $\lambda$ as a function of the modulation order M is shown in Table 1 described earlier.

Once the equalized received signal is rescaled or normalized, the received signal is forwarded to stage D (saturation stage), where the received signal is saturated to a closed range. In the non-limiting example shown in FIG. 7, the received signal is saturated to $\pm\sqrt{2^M}$. The signal Y is then sent to an appropriate normalized LLR computation stage E. It should be emphasized that for exemplary embodiments such as the embodiment depicted in FIG. 7 (and FIG. 2), the use of scaling and saturation in stages C and D allows the ASK demodulators 716, 718, 720, 722 in stage E to be implemented without the use of multiplication operations. In stage F, the normalized LLR $\tilde{\Lambda}(b_m)$ is scaled back to its true value in block 214 such that $$\Lambda(b_m) = \tilde{\Lambda}(b_m) \times \left(\frac{-|h|^2}{2\lambda^2 \sigma^2}\right)$$

to obtain the LLR value, $\Lambda(b_m)$. For some embodiments, this "un-scaling" (or rescaling) factor may be given by:

$$\frac{-|h|^2}{(2\lambda^2 \sigma^2)}.$$

It should be noted that all multiplication operations shown in FIG. 7 are real. Furthermore, the sum $\Sigma_k h_k h_k^* {}_k (\text{or } \sqrt{\Sigma_k h_k h_k^*}{}_k)$ is assumed to be pre-computed in the channel estimation module, and fed to the SISO detector 700. The SISO detector 700 complexity can be further reduced by considering the following approximations. First, the multiplication by $$-\frac{\sum_{k=1}^{R} h_k h_k^*}{2\lambda^2 \sigma^2}$$

shown in stage F can be replaced with a shift operation by the closet power-of-two number. While this may result in some performance degradation, replacement of the multiplication operation by the shift operation can reduce the computational resources needed. Another approximation involves the normalization by the noise variance $\sigma^2$. As those skilled in the art will appreciate, when Viterbi or ML-MAP decoders are used, the normalization by noise variance $\sigma^2$ is generally not useful and can therefore be ignored, while yielding no performance degradation.

Figure 8:
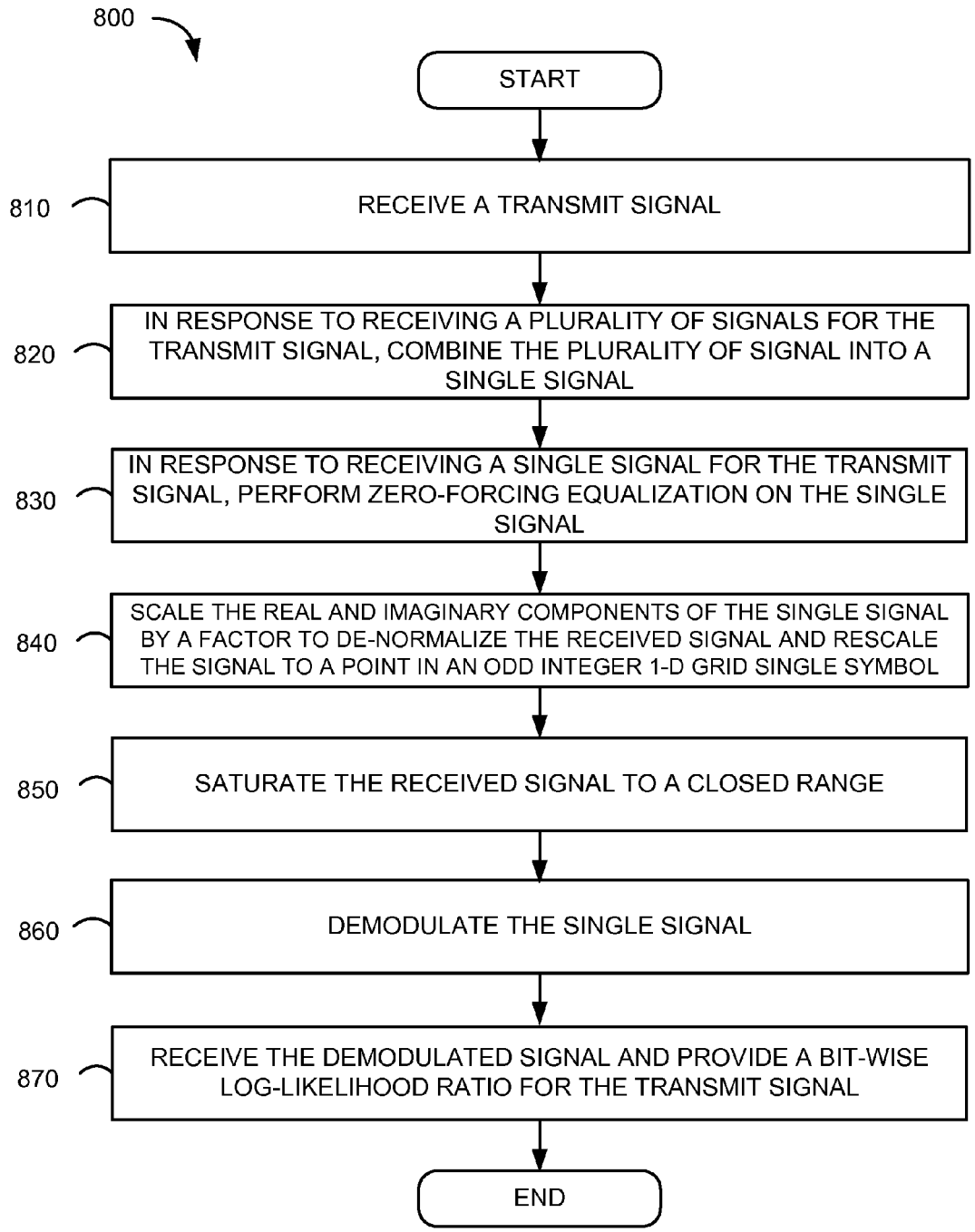
FIG. 8 is an embodiment for performing detection in the wireless communication system shown in FIG. 4.

Reference is made to FIG. 8, which is an embodiment for performing SISO detection in a wireless communication system. In block 802, a transmit signal is received. For some embodiments, the transmit signal may be a SISO signal received over a WiMAX environment. As described earlier, the transmit signal may be sent using repetition protocol or mode such as HARQ. In step 820, if the transmit signal is sent using a repetition protocol (e.g., where the transmit signal is sent in a repetitive fashion), the signals are combined (step 820). If the transmits signal is not sent using a repetition protocol, then the transmit signal undergoes zero-forcing equalization (step 830).

In step 840, the real and imaginary components of the equalized signal are scaled by a factor to de-normalize the received signal and rescale the signal to a point in an odd integer 1-D grid. In accordance with some embodiments, the (inverse scaling) factor $\lambda$ is related to the value M, which varies as a function of the constellation size and represents the number of bits per constellation. In step 850, the signal undergoes saturation where the signal is saturated to a closed range. For some embodiments, the signal may be saturated to $\pm\sqrt{2^M}$. In step 860, the signal is demodulated. In particular, the signal may be demodulated using the ASK demodulators described earlier. In step 870, a bit-wise LLR $\Lambda(b_m)$ based on the received signal is provided.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A communication system comprising:
   a soft-output detector configured to receive a transmit signal and output reliability information regarding the received signal, wherein the detector comprises a symbol combiner configured to operate in both a repetition mode and a non-repetition mode, wherein repetition mode comprises receiving a plurality of signals for the transmit signal, wherein the detector further comprises:
   a rescaling block configured to scale a real and imaginary component of the received transmit signal by a factor to de-normalize the received signal and rescale the signal to a point in an odd integer 1-D grid; and
   a saturation block configured to saturate the de-normalized received signal.

2. The system of claim 1, wherein the received signal is a single-input single-output (SISO) signal in a WiMAX (Worldwide Interoperability for Microwave Access) environment, and wherein the reliability information comprises bit-wise log likelihood ratio (LLR).

3. The system of claim 1, wherein the symbol combiner is configured to combine a plurality of received signals associated with the transmit signal into a single signal in response to receiving the transmit signal in repetition mode.

4. The system of claim 3, wherein the symbol combiner combines the plurality of received signals by performing maximum ratio combining (MRC) to generate a single signal, and wherein the symbol combiner is further configured to perform zero-forcing (ZF) equalization on the transmit signal in response to receiving the transmit signal in non-repetition mode.

5. The system of claim 4, wherein the detector further comprises a demodulator, wherein the demodulator is configured to receive the single signal from the symbol combiner and demodulate the single signal and output reliability information.

6. The system of claim 5, wherein the demodulator comprises one or a plurality of amplitude shift key (ASK) demodulators.

7. The system of claim 1, wherein the factor is based on a modulation order of the transmit signal such that the factor comprises:

$$\frac{\sqrt{2}}{4}$$

for a modulation order of 2;
$\sqrt{10}$ for a modulation order of 4; and
$\sqrt{42}$ for a modulation order of 6.

8. The system of claim 1, wherein the received signal is saturated to $\pm\sqrt{2^M}$, wherein M represents a modulation order of the transmit signal.

9. A method comprising:
receiving a WiMAX (Worldwide Interoperability for Microwave Access) transmit signal;
in response to receiving the transmit signal via a repetition protocol, combining a plurality of signals received via the repetition protocol into a single signal;
scaling a real and imaginary component of the single signal by a factor to de-normalize the received signal and rescale the signal to a point in an odd integer 1-D grid single symbol;
performing saturation on the de-normalized received signal by saturating the de-normalized received signal to $\pm\sqrt{2^M}$, wherein M represents a modulation order of the transmit signal;
demodulating the single signal; and
providing reliability information regarding the demodulated symbol.

10. The method of claim 9, wherein the received signal is a single-input single-output (SISO) signal, and wherein the reliability information comprises bit-wise log likelihood ratio (LLR).

11. The method of claim 9, wherein the factor is based on a modulation order of the transmit signal such that the factor comprises:

$$\frac{\sqrt{2}}{4}$$

for a modification order of 2;
$\sqrt{10}$ for a modulation order of 4; and
$\sqrt{42}$ for a modulation order of 6.

12. The method of claim 9, wherein demodulating the single signal comprises demodulating the scaled and saturated received signal.

13. The method of claim 9, wherein combining the plurality of signal into a single signal comprises performing maximum ratio combining (MRC).

14. The method of claim 9, further comprising: in response to receiving a single signal for the transmit signal, performing zero-forcing (ZF) equalization on the transmit signal.

15. A communication system comprising:
means for receiving a transmit signal in a WiMAX (Worldwide Interoperability for Microwave Access) environment;
means for combining a plurality of signals into a single signal when the plurality of signals is received for the transmit signal;
means for performing zero-forcing (ZF) equalization on the transmit signal when a single signal is received;
means for scaling a real and imaginary component of the single signal by a factor to de-normalize the received signal and rescale the signal to a point in an odd integer 1-D grid single symbol; and
means for performing saturation on the de-normalized received signal by saturating the de-normalized received signal to $\pm\sqrt{(2^M)}$, wherein M represents a modulation order of the transmit signal.

16. The system of claim 15, wherein the factor is based on a modulation order of the transmit signal such that the factor comprises:

$$\frac{\sqrt{2}}{4}$$

for a modulation order of 2;
$\sqrt{10}$ for a modulation order of 4; and
$\sqrt{42}$ for a modulation order of 6.

17. The system of claim 15, further comprising:
means for demodulating the scaled and saturated received signal; and
means for providing a bit-wise log likelihood ratio (LLR) for the transmit signal.

* * * * *

UNITED STATES PATENT AND TRADEMARK OFFICE
CERTIFICATE OF CORRECTION

PATENT NO. : 8,102,946 B2
APPLICATION NO. : 12/168480
DATED : January 24, 2012
INVENTOR(S) : Pons et al.

It is certified that error appears in the above-identified patent and that said Letters Patent is hereby corrected as shown below:

In Column 4, Line 40, delete "resealing)" and insert -- rescaling) --, therefor.

In Column 10, Line 6, in Claim 11, delete "modification" and insert -- modulation --, therefor.

In Column 10, Line 32, in Claim 15, delete "+√(2^M)," and insert -- +√2M, --, therefor.

Signed and Sealed this
Fifth Day of February, 2013

Teresa Stanek Rea
*Acting Director of the United States Patent and Trademark Office*